United States Patent [19]

Rohlf et al.

[11] 4,014,271
[45] Mar. 29, 1977

[54] LIQUID MANURE SYSTEM

[75] Inventors: Vincent E. Rohlf, Sturgeon Bay; Karl R. Kratz; Richard F. Hucek, both of Algoma, all of Wis.

[73] Assignee: The Calumet Co., Inc., Algoma, Wis.

[22] Filed: Nov. 5, 1975

[21] Appl. No.: 628,988

[52] U.S. Cl. .................. 111/7; 198/671; 214/83.32; 239/172; 239/662
[51] Int. Cl.² ............................. A01C 23/02
[58] Field of Search ............ 111/7, 88, 6; 239/117, 239/146, 148, 155, 172, 175, 436, 661, 461, 662; 214/83.32; 198/670, 671; 222/156, 177, 176

[56] References Cited
UNITED STATES PATENTS

| | | | |
|---|---|---|---|
| 2,792,255 | 5/1957 | Bellows | 239/461 X |
| 2,975,978 | 3/1961 | Propst | 239/148 |
| 3,136,485 | 6/1964 | Bellows et al. | 239/148 X |
| 3,294,407 | 12/1966 | Vander Pol | 239/148 |
| 3,489,320 | 1/1970 | MacKinnon | 239/172 |
| 3,490,698 | 1/1970 | Irving et al. | 239/172 |
| 3,534,888 | 10/1970 | MacKinnon | 239/148 X |
| 3,544,010 | 12/1970 | Jurdyc | 239/172 X |
| 3,544,011 | 12/1970 | van der Lely | 239/175 |
| 3,793,967 | 2/1974 | Van den Berg | 111/7 |
| 3,842,764 | 10/1974 | Bauer | 111/7 |
| 3,865,056 | 2/1975 | Danford | 111/7 |
| 3,905,523 | 9/1975 | Ahlers et al. | 239/172 X |
| 3,911,837 | 10/1975 | Quick | 111/7 |

*Primary Examiner*—Edgar S. Burr
*Assistant Examiner*—James R. Feyrer
*Attorney, Agent, or Firm*—Andrus, Sceales, Starke & Sawall

[57] ABSTRACT

An apparatus for distributing liquid manure including a mobile spreader tank to contain the liquid manure and adapted to be drawn by a tractor. A frame is supported by the three-point hitch of the tractor, and a series of soil working elements are mounted on the frame and are adapted to penetrate the soil when the frame is lowered. A delivery tube for the liquid manure is positioned behind each soil working element, and a flexible conduit connects each delivery tube with a valve controlled outlet in the tank. The liquid manure is delivered through the conduit system to the delivery tubes by an auger located within the tank, or alternately, by pressurizing the spreader tank.

7 Claims, 7 Drawing Figures

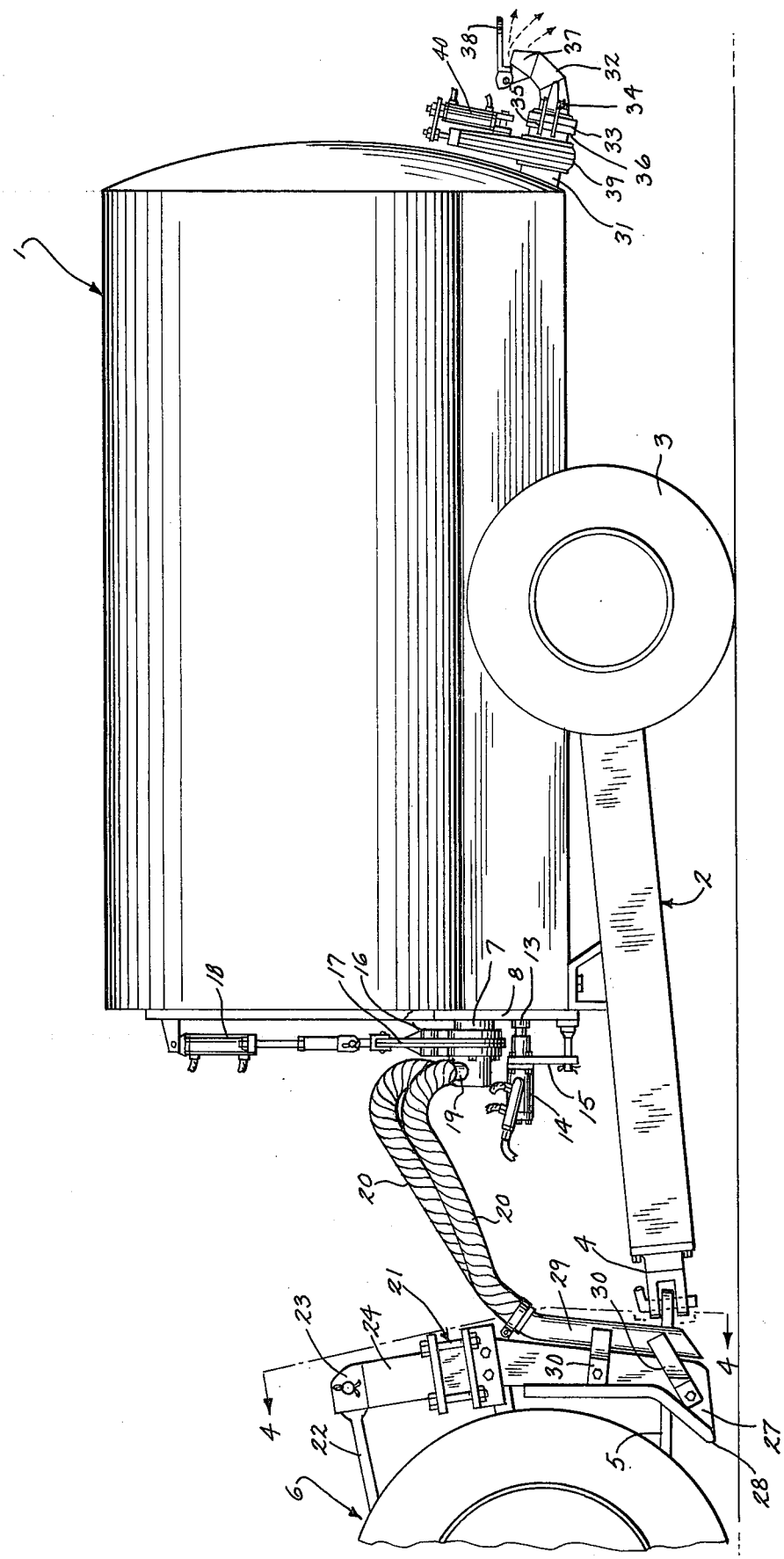

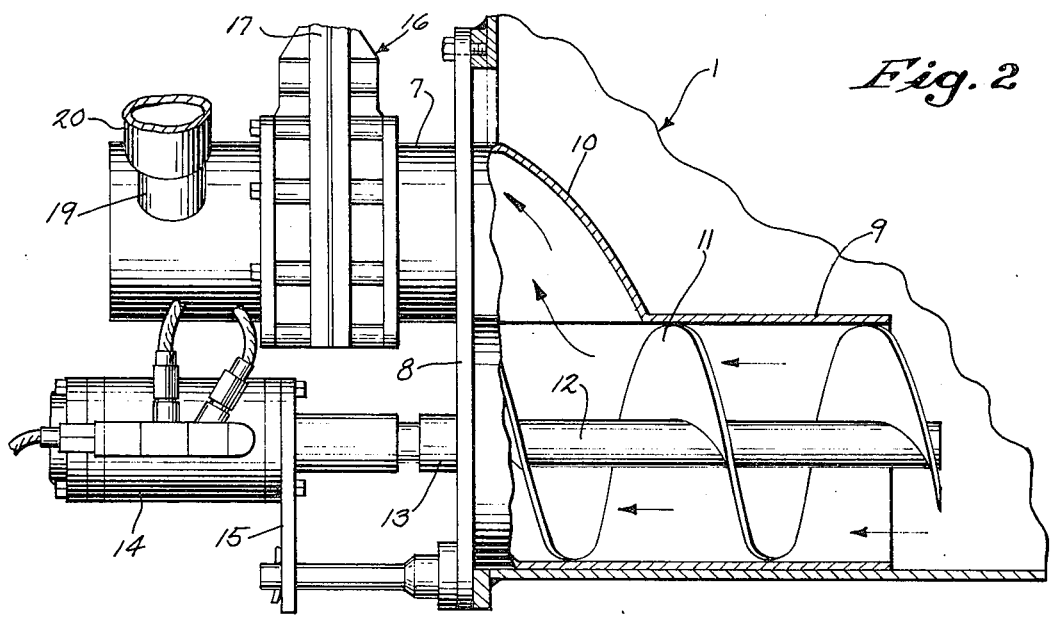
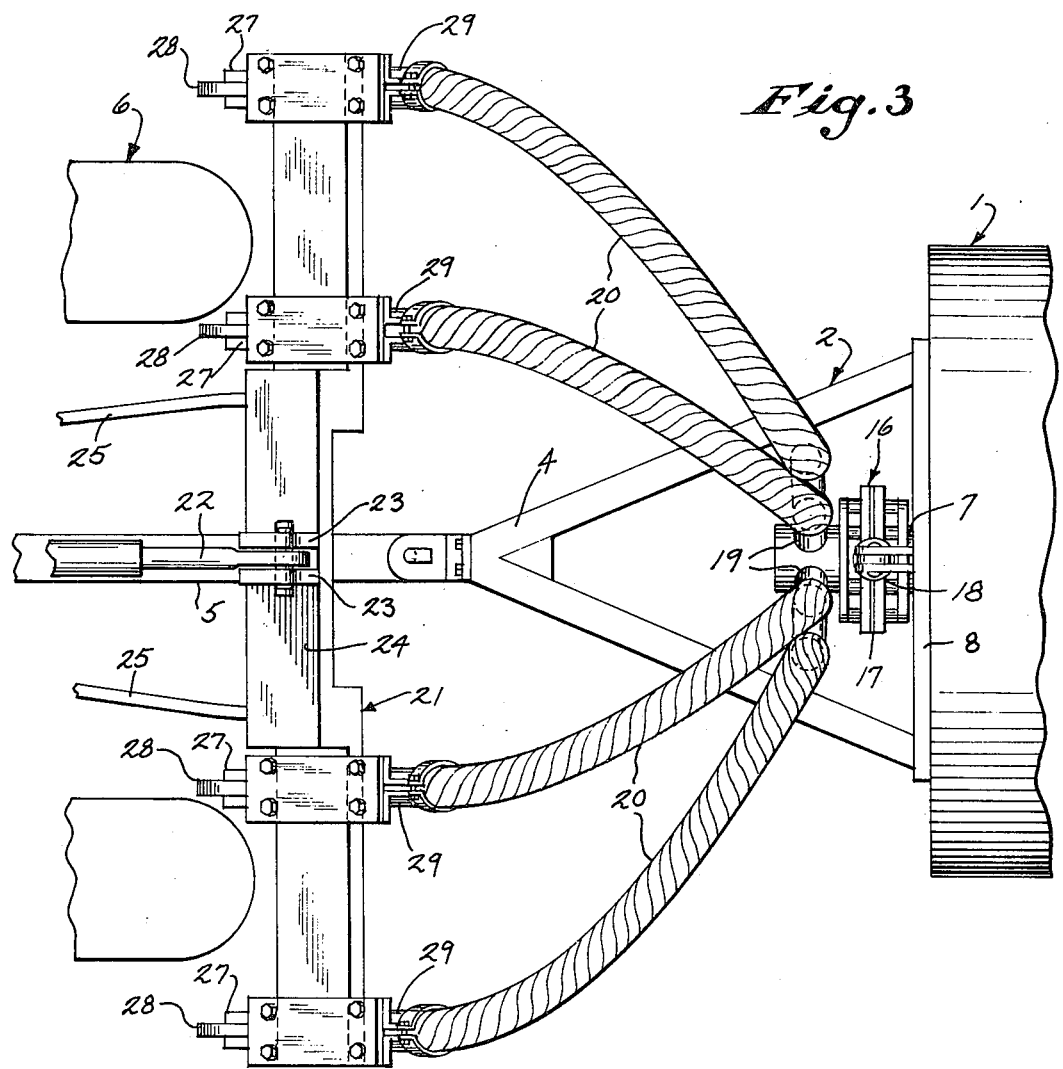

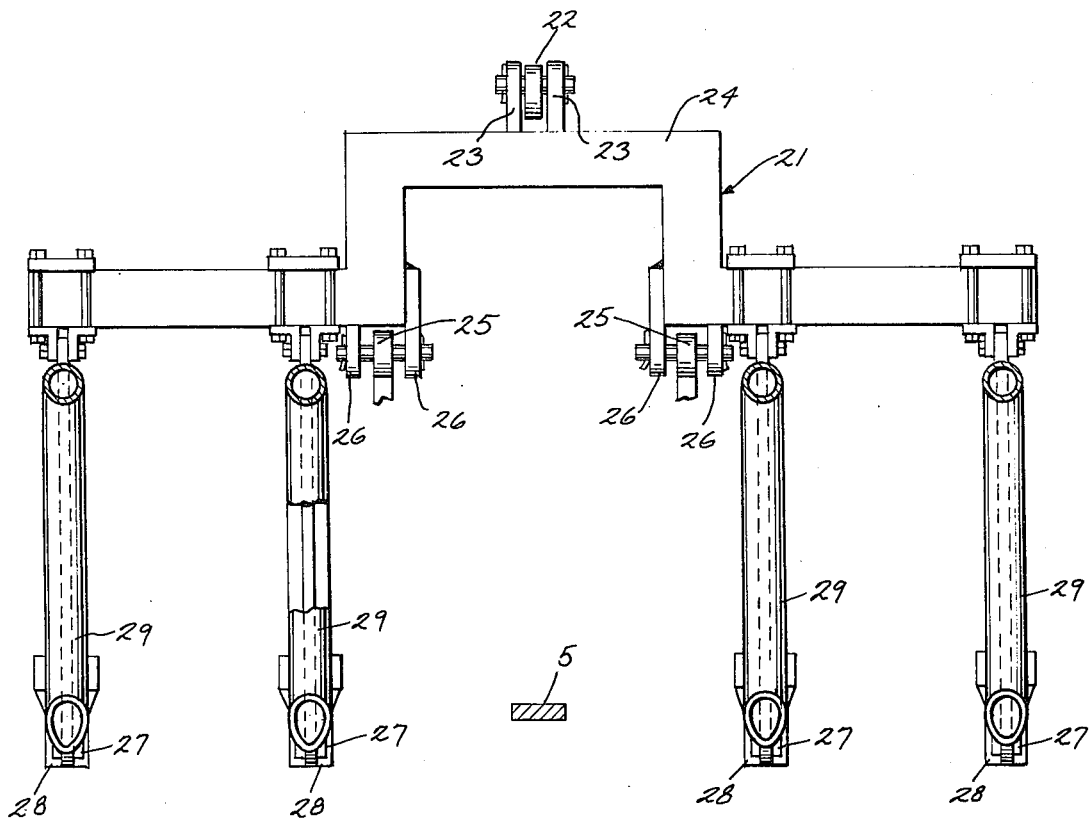
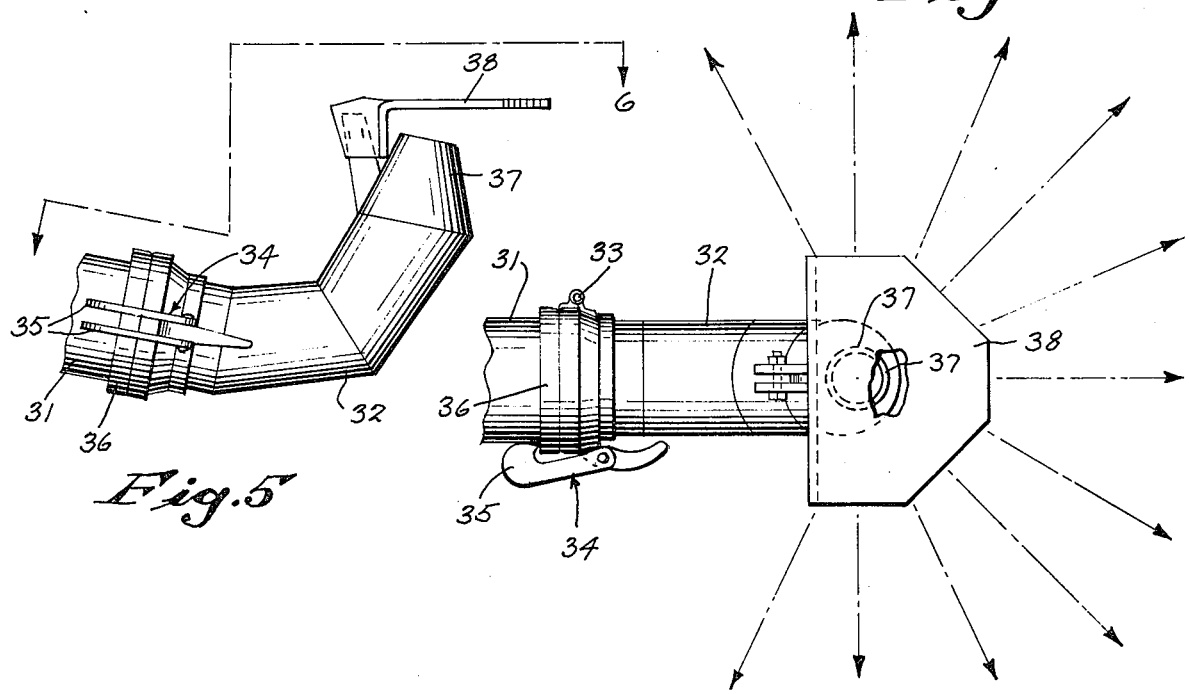

LIQUID MANURE SYSTEM

BACKGROUND OF THE INVENTION

In the conventional liquid manure system, liquid manure in the form of a slurry, is stored in a reservoir and periodically it is pumped from the reservoir to a spreader tank which is drawn by a tractor. In some cases the liquid manure in the tank is spread over the ground surface by a spray device while in other cases, the liquid manure is discharged from the spreader tank adjacent a series of plow elements, or soil penetration elements, which penetrate the soil so that the liquid manure is discharged beneath grade.

U.S. Pat. No. 3,793,967 shows an apparatus for distributing liquid manure beneath grade level, and in that patent a rigid, hollow frame is mounted on the three-point hitch of the tractor and plow elements or soil penetrators are connected to the lower ends of the frame. The liquid manure is conducted through a flexible tube to the hollow frame and discharged behind the plow elements.

SUMMARY OF THE INVENTION

The invention relates to an improved apparatus for distributing liquid manure which includes a mobile spreader tank which is adapted to contain the liquid manure in the form of a slurry and is drawn by a tractor. Supported from the three-point hitch of the tractor is a transverse frame which carries a series of soil working members or plow elements that are adapted to penetrate the soil when the three-point hitch is lowered. A delivery tube for the liquid manure is mounted immediately behind each plow element and each delivery tube is connected through a flexible conduit to an outlet in the spreader tank which is controlled by a valve.

In one embodiment the liquid manure is conducted through the conduit system to each delivery tube by an auger pump which is located in the spreader tank adjacent the outlet. The auger is housed within a generally cylindrical housing and the housing is provided with an offset which is connected to the outlet of the tank. Power is supplied to the auger by a hydraulic motor which is located on the outside of the tank adjacent the outlet.

In a second form of the invention, the liquid manure is supplied to the conduit system by pressurizing the spreader tank.

As a feature of the invention, a spreader attachment is associated with an opening at the rear of the spreader tank. The spreader attachment includes a generally L-shaped conduit which is hinged to the rear outlet to permit the conduit to be swung away from the tank to permit filling of the tank through the rear opening. A deflector plate is mounted adjacent the end of the L-shaped conduit and serves to deflect the liquid manure outwardly in the desired spray pattern.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the manure spreading apparatus of the invention;

FIG. 2 is an enlarged side elevation of the liquid manure distributing apparatus with parts broken away and showing the auger feed mechanism;

FIG. 3 is a top view of the liquid manure distributing system as attached to a tractor;

FIG. 4 is a view taken along line 4—4 of FIG. 1;

FIG. 5 is a fragmentary side elevation of the spreader unit;

FIG. 6 is a view taken along line 6—6 of FIG. 5; and

DESCRIPTION OF THE PREFERRED EMBODIMENT

Figure 7:
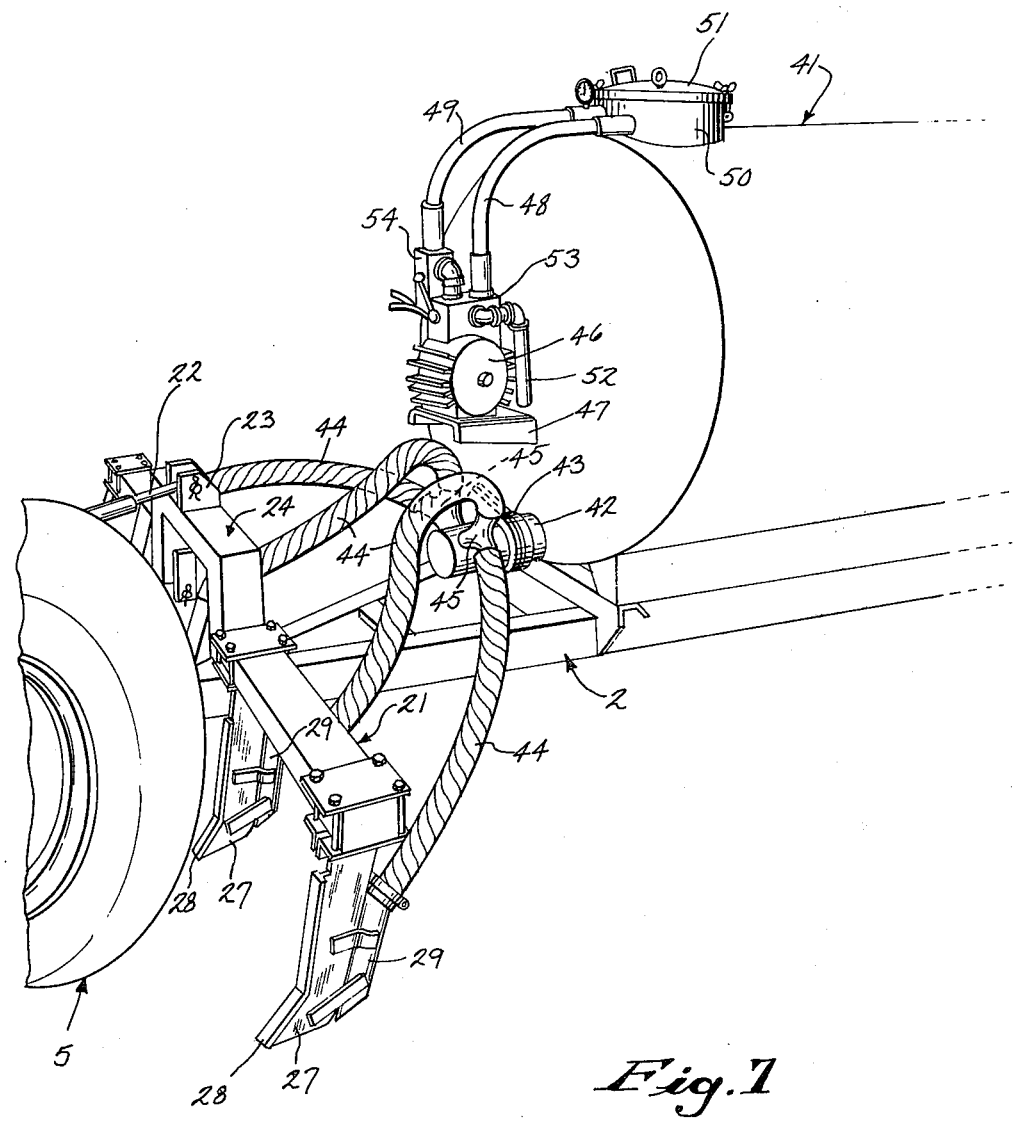
FIG. 7 is a perspective view of a modified form of the invention using a vacuum system.

FIGS. 1–6 illustrate a liquid manure system which includes a spreader tank 1 which is mounted on a frame or chassis 2 having wheels 3 to enable the tank to be moved across the ground. As shown in FIG. 1, the frame 2 is provided with a tongue 4 which is attached to the drawbar 5 of a tractor 6.

The front end of the spreader tank 1 is provided with a discharge outlet 7 which is formed integrally with a mounting plate 8 that is attached to the front header of the tank 1. As best shown in FIG. 2, a housing 9 is carried by the mounting plate 8 and extends inwardly of tank 1. The inner portion of the housing 9 is generally cylindrical in shape, while the outer portion is provided with an offset 10 which communicates with the discharge outlet 7.

The liquid manure within the tank 1 is conveyed through the outlet 7 by means of an auger 11 that rotates within the housing 9. One end of the auger shaft 12 extends outwardly through the mounting plate 8 and is journalled within a bearing assembly 13 mounted on the plate. Power is supplied to the auger shaft 12 by means of a hydraulic motor 14 which is mounted on a bracket 15 supported from the mounting plate 8. With this construction, operation of the hydraulic motor 14 will rotate the auger 11 to thereby deliver the liquid manure through the housing 9 and off-set section 10 to the discharge outlet 7.

To control the flow of the liquid manure from the tank, a valve assembly 16 is associated with the discharge outlet 7. Valve assembly 16 includes a sliding valve member 17 which is moved between an open and closed position by hydraulic cylinder unit 18 mounted on the front header of the spreader tank 1.

Connected to the outlet 7 are a pair of Y-shaped manifolds 19 and flexible conduits 20 are connected to each branch or arm of the manifold.

A frame 21 extends transversely across the rear of the tractor and is attached to the three-point hitch of the tractor. As illustrated in FIG. 4, the upper arm 22 of the three-point hitch is pivotally connected to lugs 23 which extend upwardly from the central section 24 of the frame, while the lower arms 25 of the three-point hitch are each connected to lugs 26 which depend from the outer sections of the frame 21. As the arms 22 and 25 of the three-point hitch are raised and lowered, the frame 21 will correspondingly be raised and lowered.

Mounted at spaced intervals along the length of the frame 21 are a series of soil working members, such as plow elements 27, which terminate in lower tips 28 adapted to penetrate the soil as the frame 21 is lowered through operation of the three-point hitch. A delivery tube 29 for discharging liquid manure is mounted immediately behind each of the plow elements 27 by straps 30, and one of the conduits 20 is connected to each delivery tube so that the liquid manure or slurry can be delivered through each of the flexible conduits 20 to the respective delivery tubes.

During transporting, the frame 21 is in an upper position so the plow elements 27 will be out of contact with the soil. When it is desired to distribute the liquid manure, the frame 21 is lowered to a position where the plow elements 27 will dig a furrow in the soil, generally in the range of 6 to 16 inches deep as the unit is moved across the ground. The hydraulic motor 14 is then operated to drive the auger 11, and valve 17 is opened so that the liquid manure will be delivered through the conduit system to the delivery tubes 29 for discharge beneath the ground level, behind the plow elements.

The apparatus of the invention also includes a spreader device for spreading the liquid manure over the ground surface. In this regard, the rear end of the tank 1 is provided with an outlet 31, and a generally L-shaped spreader tube 32 is hinged to the outlet 31 by hinge 33. A toggle coupling 34 connects tube 32 to outlet 31 and is provided with a pair of hook-shaped latch members 35 which are adapted to engage a ridge or collar 36 on the outlet 31 when the toggle 34 is closed, to thereby lock the spreader tube 32 to the outlet 31. As shown in FIG. 5, the upper end 37 of the spreader tube 32 is tapered, and a deflector plate 38 is mounted above the tapered outlet in a position to deflect the liquid manure outwardly in the desired spray pattern.

A valve unit 39 which is operated through cylinder 40 serves to control the flow through outlet 31.

The hinged connection between the spreader tube 32 and the outlet 31 enables the spreader tube to be swung to the side so that a filling hose can be connected to outlet 31 for filling the spreader tank 1 with the liquid manure or slurry.

FIG. 7 illustrates a modified form of the invention in which the liquid manure is delivered to the conduit system and ultimately to the delivery tubes 29 by pressurizing the spreader tank. In this embodiment, the forward head of tank 41, corresponding to tank 1 of the first embodiment, is provided with an outlet 42 and a valve assembly 43 is employed to control the flow of the liquid manure through the outlet. A series of flexible conduits 44 corresponding to the conduits 20 of the first embodiment, connects the Y-shaped manifolds 45 on outlet 42 with the delivery tubes 29.

As illustrated in FIG. 7, a vacuum pump 46 is mounted on a mounting bracket 47 attached to the forward head of the tank 41 and lines 48 and 49 connect the pump 46 with the interior of the tank 41. The upper ends of the lines 48 and 49 are connected to a manhole 50 which is enclosed by a hinged cover 51.

Line 48 is a pressure line and is adapted to supply air under pressure from pump 46 to the interior of the tank 41, while line 49 is a vacuum line through which air is drawn from the tank to provide a sub-atmospheric pressure in the tank. Connecting pump 46 with the atmosphere is a line 52, and a conventional valve assembly 53 is mounted on the pump and serves to control the flow of the air through the lines 48, 49 and 52. A sediment trap 54 is mounted within the vacuum line 49 to prevent foreign material from the tank from entering the pump. During filling, a vacuum will be drawn on the interior of tank 1 through line 49 and the pressure differential will act to draw liquid manure into the tank from a reservoir. When it is desired to discharge the liquid manure through the conduits 44, the valve assembly 53 is operated to pressurize the tank through line 48, and the super-atmosperic pressure will then force the liquid manure through the conduits 44 to the delivery tubes 29 associated with the plow elements 27.

The manure distributing apparatus of the invention enables the liquid manure to either be distributed beneath grade by discharge through the delivery tubes associated with the soil penetrating elements, or alternately to be spread over the surface of the soil through use of the spreader tube 32.

Various modes of carrying out the invention are contemplated as being within the scope of the following claims particularly pointing out and distinctly claiming the subject matter which is regarded as the invention.

We claim:

1. An apparatus for distributing liquid manure beneath the ground surface, comprising a mobile chassis, a tank to contain the liquid manure and mounting on the chassis, said tank having an outlet opening in an end wall thereof, a frame to be connected to a vertically movable hitch of a vehicle and adapted to be raised and lowered in accordance with operation of said hitch, a plurality of soil penetrating members mounted on the frame and adapted to penetrate the soil when the frame is lowered, conduit means for conducting liquid manure from the tank and including a delivery tube mounted immediately behind each soil penetrating member whereby the liquid manure will be discharged below the surface of the soil, an auger assembly including a housing located on the inside of the tank and connected with a outlet therein, said auger assembly also including an auger disposed within the housing and disposed to convey liquid manure through said housing to said outlet, said auger assembly having a length substantially less than the length of the tank, the outer end of the auger extending through said end wall and the inner end of the auger terminating within the interior of the tank, the axis of the outlet being offset from the axis of the auger, and drive means mounted on said end wall of the tank and located on the outside of the tank and operably connected to the outer end of the auger for driving the same.

2. The apparatus of claim 1, wherein the housing has a generally cylindrical first section disposed within the tank having an open end to receive the liquid manure, the axis of said cylindrical housing section being off-set from the axis of said outlet, said housing having a second section disposed within the tank connecting the cylindrical section with said outlet.

3. The apparatus of claim 2, wherein said apparatus includes a mounting plate secured to said end wall of the tank and bordering the outlet therein, said housing being connected to said mounting plate and extending inwardly of the tank, said auger including a shaft having an end projecting outwardly through aligned openings in the end wall of said tank and said mounting plate, said drive means being supported by said mounting plate and connecting to the projecting end of the auger shaft, said apparatus also including bearing means mounted on the plate for journaling the auger shaft.

4. The apparatus of claim 1, wherein said tank has a second end wall having a second outlet to discharge liquid manure, and said apparatus includes spray means connected to the second outlet for spraying the liquid manure being discharged from said second outlet over the surface of the ground.

5. The apparatus of claim 4, wherein said spray means is hinged to said second outlet whereby the spray means can be swung to an inoperative position so that the second outlet can be used for filling the tank with liquid manure.

6. The apparatus of claim 1, wherein said auger includes a shaft which extends through the end wall of the tank, said drive means being operably connected to the shaft.

7. The apparatus of claim 5, wherein the spray means comprises a pipe having a vertically extending discharge aperture, and a deflector plate mounted above said discharge aperture to spray the liquid manure in the desired spray pattern.

* * * * *

UNITED STATES PATENT AND TRADEMARK OFFICE
CERTIFICATE OF CORRECTION

PATENT NO. : 4,014,271
DATED : March 29, 1977
INVENTOR(S) : VINCENT E. ROHLF, ET AL It is certified that error appears in the above-identified patent and that said Letters Patent are hereby corrected as shown below:

Column 4, Line 18 (CLAIM 1) Cancel "mounting" and substitute therefor ---mounted---.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*